W. JAMESON.
SAFETY DEVICE FOR CALENDER ROLLS.
APPLICATION FILED MAY 8, 1909.
962,572.
Patented June 28, 1910.
2 SHEETS—SHEET 1.
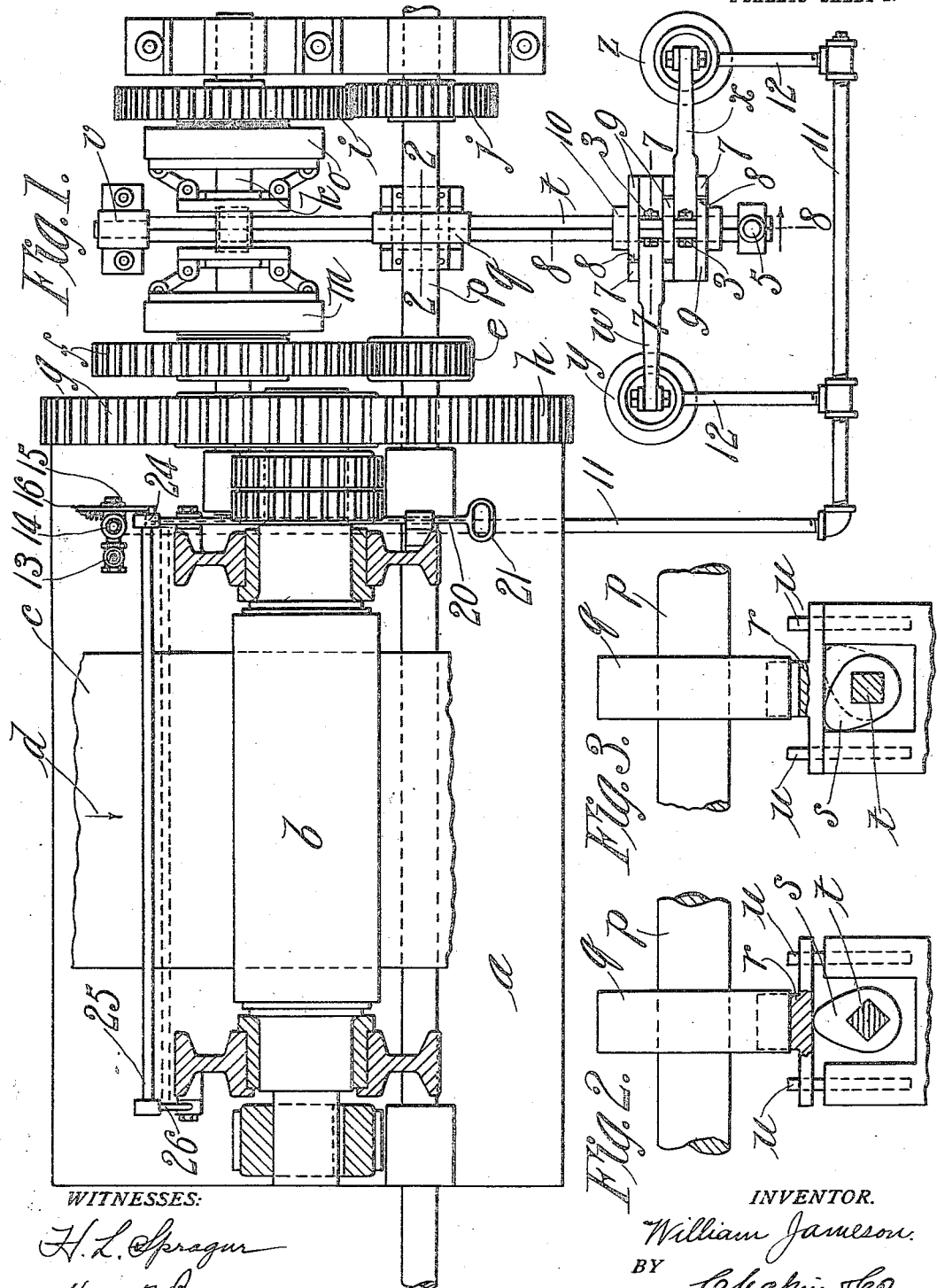
WITNESSES:
H. L. Sprague
Harry M. Bower
INVENTOR.
William Jameson.
BY Chapin Lee
ATTORNEYS.

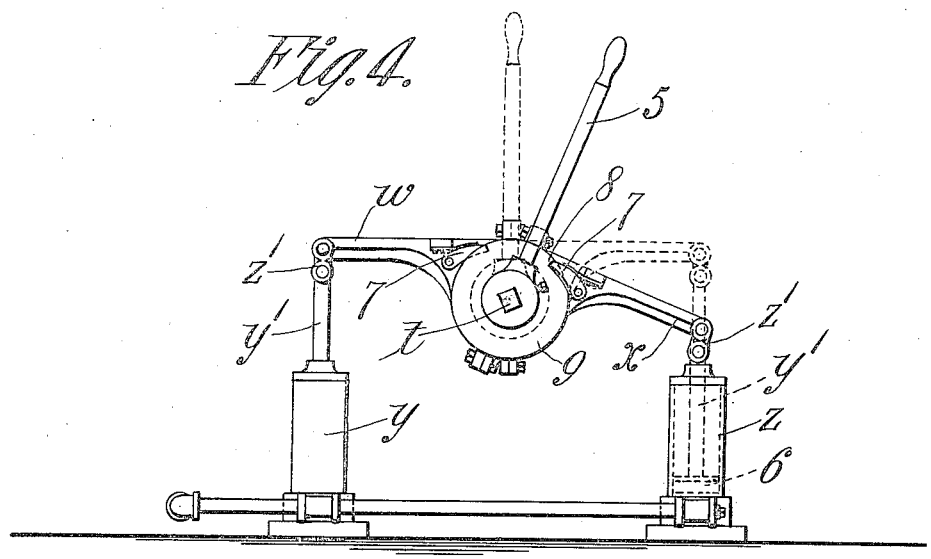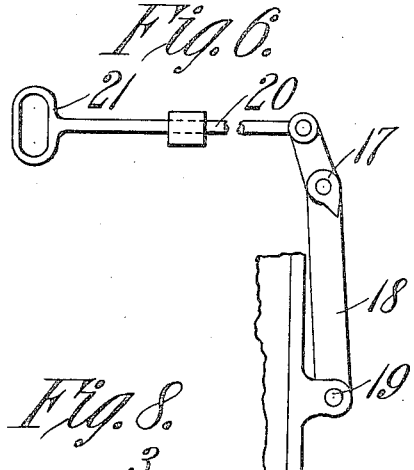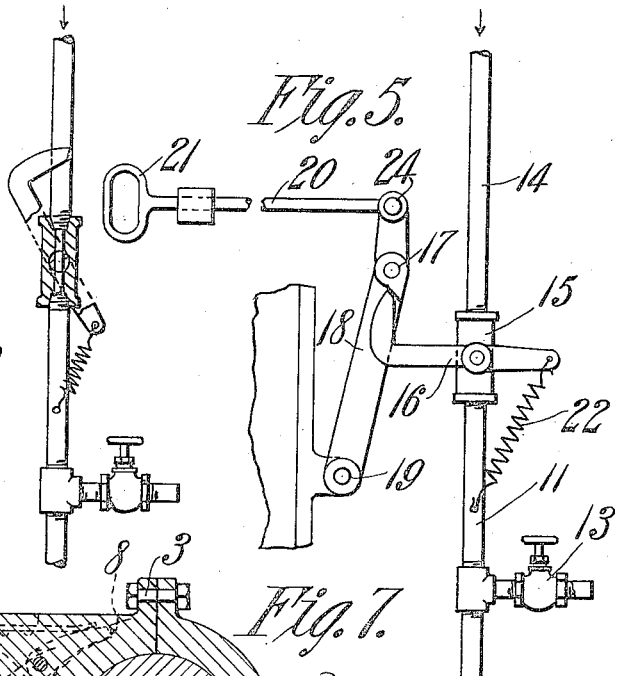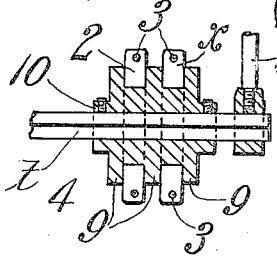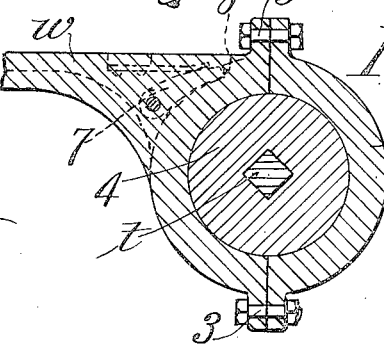

UNITED STATES PATENT OFFICE.

WILLIAM JAMESON, OF CHICOPEE FALLS, MASSACHUSETTS, ASSIGNOR TO THE FISK RUBBER COMPANY, OF CHICOPEE FALLS, MASSACHUSETTS, A CORPORATION.

SAFETY DEVICE FOR CALENDER-ROLLS.

962,572.

Specification of Letters Patent. Patented June 28, 1910.

Application filed May 8, 1909. Serial No. 494,772.

*To all whom it may concern:*

Be it known that I, WILLIAM JAMESON, a citizen of the United States of America, residing at Chicopee Falls, in the county of Hampden and State of Massachusetts, have invented new and useful Improvements in Safety Devices for Calender-Rolls, of which the following is a specification.

The present invention relates to improvements in safety stop mechanisms for calendering machines.

The objects of the invention, are, (1) to provide a mechanism by means of which the rotation of the rolls may quickly be brought to a standstill, should an accident to an attendant occur; (2) to provide a mechanism by means of which the speed of rotation of the rolls may be quickly changed as desired; (3) to provide means for automatically applying a brake device for bringing the moving parts of the machine to a standstill, whether the brake device is operated by hand or compressed air.

In the drawings forming part of this application,—Figure 1 is a plan view of a calendering machine showing my improvements attached thereto. Figs. 2 and 3 are detail sectional views on the broken line 2—2, Fig. 1 of the frictional brake device. Fig. 4 is an end elevational view of the cylinders for receiving compressed air or steam by means of which the clutch and brake mechanisms are operated, and showing further the operating handle by means of which the clutches may be operated and the pistons of the air cylinders moved to the bottom or air-receiving end thereof. Fig. 5 is a detail view in side elevation of the operating handle and an attached lever for throwing into action a spring-actuated valve, whereby the machine may be stopped. Fig. 6 is a detail view of the valve in section, and the parts in position after being released by the operating handle, the operating lever being shown in a drawn back position. Fig. 7 is a detail sectional view on the line 7—7 of Fig. 1. Fig. 8 is a sectional view on the line 8—8 of Fig. 1.

Referring to the drawings in detail, in which the same reference characters designate the same parts in the several views: $a$ designates the framework of the machine in which is mounted the calender rolls, only one of which appears, as shown at $b$.

The paper is indicated at $c$ as being fed into the machine, as shown by the direction of the arrow $d$.

The usual driving and speed gears are shown at $e$, $f$, $g$, $h$, $i$ and $j$. The clutches for connecting either the gears $i$ or $f$ to the countershaft $k$ are shown at $m$ and $o$.

A line-shaft is shown at $p$ which is provided with a friction disk $q$ thereon.

$r$ designates a brake-shoe for engaging the lower side of the disk $q$, when it is desired to stop the machine after the driving power has been shut off. This shoe is operated by means of a pear-shaped cam $s$ carried by the shipper-shaft $t$, and the brake-shoe $r$ is guided in its movements by means of the pins $u$ when moved by the cam. The shaft $t$ is rectangular in cross-section and is mounted in a bearing $v$, at one end, and connected to the arms $w$ and $x$ at its outer end. These arms,—one of which is shown in sectional view in Fig. 7,—are connected to the plungers or pistons of the cylinders $y$ and $z$, by means of the rods $y^1$ and links $z^1$. The arms $w$ and $x$ are each bolted to semi-circular cap-pieces 2, as shown at 3, which arms and pieces 2 encircle a member 4, and through which passes the shaft $t$ (see Fig. 7) so that when the shaft is operated, the arms $w$ and $x$ will be partially rotated.

5 designates a handle that is secured to the shaft $t$ and is for the purpose of rocking the shaft, whereby the clutches $m$ and $o$ may be thrown into or out of operative engagement, and also for moving either of the arms $w$ and $x$, whereby the pistons 6 of the cylinders $y$ and $z$ are operated.

7 is a spring-pressed pawl pivoted to each of the arms $w$ and $x$ and which engage a shoulder portion 8 in the three flange portions 9 of the channel member 10 which moves with the shaft $t$ when operated by the handle 5. This operation of the handle causes one or the other of the arms $w$ and $x$ to turn on the disk 4 of the channel member 10 so that one of the pistons 6 may be moved downward to its lower position, as shown in dotted lines in Fig. 4, since the pawl 7 will engage the shoulder portion 8 (see Fig. 7) on that side of the flange portions 9 of the channel member 10 when the handle is moved in that direction (see Fig. 4). The other piston of course remains unmoved in an upward position.

Connected with the bottom portion of each cylinder y and z is a pipe 11, by means of the branches 12, which pipe leads to the forward or feed side of the machine, where a relief valve is shown at 13 to permit the confined air in the pipe 11 to escape when the pistons 6 are moved down.

Air, or steam under pressure, is supplied to the pipe 11 by means of the upright portion 14. The communication between the upright 14 and the pipe 11 is controlled by means of a valve 15, the plug of which is operated by means of an L-shaped arm 16 which normally holds the valve closed, as shown in Fig. 5, by means of a lug or tooth 17 on a lever 18 which is pivoted to a support at 19.

A rod 20 is attached to the lever 18 and is provided with a handle 21, as shown in Fig. 1, that extends to the feed or front side of the machine within reach of the attendant at that point.

A coiled spring 22 is attached to the L-shaped arm 16 and pipe 14 respectively, for holding the plug of the valve in a closed position.

Connected at 24 to one end of the lever 18 is a rod 25 that extends across the front of the machine, the free end being connected to a pivotal arm 26.

The operation of the machine is as follows: If the operator wishes to stop the machine he may do so by releasing the L-shaped arm 16, permitting the spring 22 to open the valve 15 and allow air or steam, under pressure, to enter the pipe 11, branches 12, and cylinders y and z, causing the piston 6 to be elevated, rocking the shaft t, and throwing either one or the other of the clutches m or o to be operated, whereby the machine will be stopped. At the same time, the cam s moves the brake-shoe r against the disk q in order to lessen the momentum of the moving parts.

Should the attendant at the forward or feed side of the machine accidentally be caught between the rollers, so that he would be deprived of the use of his hands, he could, by pressing with his head or body, operate the rod 25 which, in turn, would trip the arm 16 and cause the machine to come to a standstill, as already described.

It should be stated that the valve 13 is closed after the piston 6 is set, as described, in its lowermost position, so that as the compressed air enters, it will not escape to the atmosphere.

It should be understood that by employing two cylinders and two sets of clutches two speeds are employed for driving the machine, and that when one piston is left idle the other is in use, as clearly shown in Fig. 4.

What I claim, is:—

1. In a stop mechanism for calender rolls, in combination, a line-shaft, a clutch mechanism therefor, fluid pressure mechanism for operating the clutch mechanism, said fluid pressure mechanism including a cylinder, a piston therein, and a pawl and ratchet connection between the piston and said clutch mechanism, substantially as described.

2. In a stop mechanism, a shaft, fluid pressure mechanism associated therewith, said mechanism comprising a cylinder, a piston in said cylinder, an arm on the shaft, a ratchet device for connecting the arm to the shaft, whereby the shaft may be operated from the piston, or the piston from the shaft, substantially as described.

3. In a stop mechanism for calender machines, in combination with the drive-shaft thereof, a brake device, a fluid pressure mechanism for operating the brake device, comprising a cylinder, a piston therein, a pipe connection leading to the cylinder, a valve in said connection, means, including a spring-actuated arm for maintaining the valve in a closed position, and a trip device for releasing said arm, said trip device including a lever, a lug on said lever for retaining said arm in an inoperative position, substantially as described.

4. In a fluid pressure stop mechanism for calender machines, in combination, a shaft, a clutch and brake device therefor, a shipper shaft, a collar thereon and movable therewith, an arm mounted on the collar, and ratchet devices on the arm for engaging the collar, a cylinder, a piston therein, a connection between the piston and arm, whereby when a fluid under pressure is supplied to the cylinder, the clutch and brake devices will be operated, substantially as described.

5. In a stop device for calender machines, in combination, a valve controlling bar extending across the feed side of the machine, a clutch device for stopping the machine, and an elastic fluid pressure mechanism located between the clutch device and said bar, and an operating handle connected to said bar and extending to the rear side of the machine, whereby the clutch device may be operated from either side of the machine, substantially as described.

WILLIAM JAMESON.

Witnesses:
G. F. LUDINGTON,
J. L. DAVITT.